Patented Jan. 29, 1935

1,989,579

UNITED STATES PATENT OFFICE 1,989,579

PROCESS FOR THE PRODUCTION OF ALKALINE HYDRATES FROM ALKALINE BICARBONATE OR CARBONATE

Friedrich Bartling, Huglfing, Germany; Jenny Bartling, executrix of said Friedrich Bartling, deceased, assignor to Alterum Kredit-Aktien-Gesellschaft, Berlin, Germany, a company of Germany No Drawing. Application November 18, 1931, Serial No. 575,950. In Germany December 17, 1930

3 Claims. (Cl. 23—185)

The invention relates to a process for the production of alkaline hydrate by treating a mixture of alkali metal bicarbonate or carbonate with carbon, to which mixture has been added an alkaline earth metal compound or a compound of magnesium, with nitrogen at high temperatures, (about 1,000° C.), subsequently hydrolyzing the reaction product at a lower temperature and submitting the mass to a leaching operation.

It has already been proposed to add alkaline earth metal compounds to mixtures of alkali and carbon in the production of cyanides but this step was mainly taken for the purpose of achieving a favourable effect on the nitrogen fixation by the addition of earth alkalies.

On the other hand it has also been proposed to add magnesia to alkali metal carbonate for the production of a permanent alkaline reaction or contact substance. But in such a process the alkali metal compound invariably remains in the sphere of the reaction and the particular characteristic of that process consisted in the fact that no fresh alkali metal was introduced into the process and no alkali metal was removed from it, but that ammonia was produced mainly by the formation of cyanide and its subsequent hydrolyzing from the alkali components.

In contradistinction to the foregoing the process according to the present invention has for its object to produce, in addition to ammonia, an alkali product of as high a value as possible and, as is well known, alkali metal hydrates have a higher sale value than have alkali metal carbonates. Accordingly the process according to the present invention differs from what has previously been known, in its effect, in that the additions during the process of producing the alkali component ensure the production of an alkali end product of high value. It should be noted that, whilst in the absence of additions of alkaline earth metal or magnesium compounds, the hydrolyzed and leached alkali is generally obtained partly as hydrate and partly as carbonate, the whole of the alkali is changed to hydrate in the presence of these added substances.

It should further be noted that in every case the alkaline earth metal initial starting material (or the magnesium compound as the case may be) is burnt to oxide during the course of the cyanide formation as a result of the high furnace temperature and consequently brings about the causticizing of the alkali present as carbonate.

The solid mass obtained as a result of carrying out the process according to the present invention is leached, filtered and the alkali metal hydrate present in the remaining solution obtained according to known methods. If the hydrolysis of the mass is carried out in a very thin layer, it will be observed that a larger amount of the alkali metal initial materials can be changed to hydrates where the mass is subjected to the prolonged action of water vapour, even without the addition of any alkaline earth metal or magnesium compound to the initial material.

Thus the formation of hydrate is assisted merely by spreading the mass in a very thin layer during the course of the reaction. It follows that, in the case of the process according to the present invention, if the material being treated is spread in a very thin layer during the course of treatment, the formation of hydrate will proceed in a simpler and more rapid manner. The solid leached residue from the reaction mass contains the alkaline earth metal or magnesium components added at the commencement of the process and this residue can with great advantage be repeatedly used as an addition to new mixtures of raw materials.

In general the alkaline earth metal or magnesium compound will be used in the form of carbonate and in such cases the carbonic acid gas which is liberated can with advantage be utilized.

I claim:—

1. A process for producing alkali metal hydrates from alkali metal salts of the group consisting of the carbonates and bicarbonates, which comprises mixing said salt with carbon and a compound of a metal of the group consisting of the alkaline earths and magnesium, heating the mixture to a temperature of substantially 1000 degrees C. in the presence of nitrogen to form alkali metal cyanide and the oxide of the metal of said group, spreading the reaction mixture in a thin layer to permit the ready escape of carbon dioxide during hydrolysis, treating the reaction product at a lower temperature with steam to hydrolyze the same, the oxide of the metal of said group operating during hydrolysis to causticize the alkali present as carbonate, and leaching alkali metal hydrate from the hydrolyzed mass.

2. A process for producing alkali metal hydrates from alkali metal carbonates and bicarbonates, which comprises mixing the same with carbon and an alkaline earth metal carbonate, heating the mixture to a temperature substantially 1000 degrees C. in the presence of nitrogen to form alkali metal cyanide and alkaline earth metal oxide, spreading the reaction mixture in a thin layer to permit the ready escape of carbon dioxide during hydrolysis, treating the reaction product at a lower temperature with steam to effect hydrolysis, the alkaline earth metal oxide operating during hydrolysis to causticize the alkali present as carbonate, and leaching alkali metal hydrate from the hydrolyzed mass.

3. A process for producing alkali metal hydrates from alkali metal carbonates and bicarbonates, which comprises mixing the same with carbon and magnesium carbonate, heating the mixture to a temperature of substantially 1000 degrees C. in the presence of nitrogen to form alkali metal cyanide and magnesium oxide, spreading the reaction mixture in a thin layer to permit the ready escape of carbon dioxide during hydrolysis, treating the reaction product at a lower temperature with steam to effect hydrolysis, the magnesium oxide operating during hydrolysis to causticize the alkali present as carbonate, and leaching alkali metal hydrate from the hydrolyzed mass.

FRIEDRICH BARTLING.